US 9,623,779 B2

(12) United States Patent
Mochizuki

(10) Patent No.: US 9,623,779 B2
(45) Date of Patent: Apr. 18, 2017

(54) BED HEIGHT ADJUSTMENT SYSTEM FOR VEHICLE

(71) Applicant: HINO MOTORS, LTD., Hino-shi (JP)

(72) Inventor: Takashi Mochizuki, Hino (JP)

(73) Assignee: Hino Motors, Ltd., Hino-shi (JP)

( * ) Notice: Subject to any disclaimer, the term of this patent is extended or adjusted under 35 U.S.C. 154(b) by 0 days.

(21) Appl. No.: 14/761,848

(22) PCT Filed: Dec. 19, 2013

(86) PCT No.: PCT/JP2013/084099
§ 371 (c)(1),
(2) Date: Jul. 17, 2015

(87) PCT Pub. No.: WO2014/112284
PCT Pub. Date: Jul. 24, 2014

(65) Prior Publication Data
US 2015/0352994 A1 Dec. 10, 2015

(30) Foreign Application Priority Data
Jan. 18, 2013 (JP) .................................. 2013-007529

(51) Int. Cl.
*B60P 1/16* (2006.01)
*B60G 17/015* (2006.01)
(Continued)

(52) U.S. Cl.
CPC .............. *B60P 1/162* (2013.01); *B60G 11/27* (2013.01); *B60G 17/015* (2013.01);
(Continued)

(58) Field of Classification Search
CPC ....... B29C 66/71; B29C 65/08; B29C 65/081; B29C 66/1122; B29C 66/43123;
(Continued)

(56) References Cited

U.S. PATENT DOCUMENTS 4,400,131 A * 8/1983 Blake ........................ B60P 1/16
222/195
4,508,388 A * 4/1985 Minami ................ B60L 11/123
105/239
(Continued)

FOREIGN PATENT DOCUMENTS

JP 62-60284 B2 12/1987
JP 63-85510 U 6/1988
(Continued)

OTHER PUBLICATIONS

International Preliminary Report on Patentability and Written Opinion issued Jul. 30, 2015 in PCT/JP2013/084099 filed Dec. 19, 2013 (English translation only).
(Continued)

*Primary Examiner* — Glenn Dayoan
*Assistant Examiner* — Sunsurraye Westbrook
(74) *Attorney, Agent, or Firm* — Oblon, McClelland, Maier & Neustadt, L.L.P.

(57) ABSTRACT

A bed height adjustment system for adjusting height of a bed of a vehicle includes: an air spring supporting the bed; a valve unit connected to an air tank and configured to adjust height of the air spring by supplying and discharging air; a relay provided with a dump-signal line and a return-signal line each connected to the valve unit; a pressure switch configured to be switched between an ON state and an OFF state based on whether air is supplied from the valve unit; and an indicator that becomes illuminated state when powered when the pressure switch is in the ON state and becomes non-illuminated state when the pressure switch is in the OFF state.

5 Claims, 2 Drawing Sheets

(51) Int. Cl.
*B60G 17/017* (2006.01)
*B60G 17/052* (2006.01)
*B60G 11/27* (2006.01)
*B60P 1/04* (2006.01)
*B60P 1/02* (2006.01)

(52) U.S. Cl.
CPC ......... *B60G 17/017* (2013.01); *B60G 17/052* (2013.01); *B60P 1/027* (2013.01); *B60P 1/045* (2013.01); *B60G 2300/02* (2013.01); *B60G 2300/04* (2013.01); *B60G 2300/38* (2013.01); *B60G 2400/60* (2013.01); *B60G 2500/201* (2013.01); *B60G 2500/202* (2013.01); *B60G 2500/30* (2013.01); *B60G 2600/20* (2013.01); *B60G 2600/204* (2013.01)

(58) Field of Classification Search
CPC ......... B29C 66/73921; B29C 66/81419; B60P 1/162; B60P 1/16; B60P 1/283; B60P 1/045; B60P 1/006; B60P 1/28; B60P 1/6454; B60P 1/04; B65F 3/00; B65F 3/06; B65F 3/26; B65F 1/1452; B65F 2003/0253; B65F 2003/0256; B65F 3/001
USPC .... 298/22 C, 17 R, 19 R, 22 R, 22 P, 11, 14; 414/555, 21, 469, 501, 332, 705; 296/101, 183.2, 98
See application file for complete search history.

(56) References Cited

U.S. PATENT DOCUMENTS

| | | | | |
|---|---|---|---|---|
| 4,542,461 A | * | 9/1985 | Eldridge | G07C 5/085 298/22 C |
| 6,312,209 B1 | * | 11/2001 | Duell | B65F 3/046 414/408 |
| 7,559,734 B2 | * | 7/2009 | Khan | B60P 1/006 298/22 C |
| 8,840,189 B2 | * | 9/2014 | Minoshima | B60P 1/162 298/22 R |

FOREIGN PATENT DOCUMENTS

| | | |
|---|---|---|
| JP | 5-58410 U | 8/1993 |
| JP | 6-19363 Y2 | 5/1994 |
| JP | 6-41241 B2 | 6/1994 |
| JP | 3767397 B2 | 4/2006 |
| JP | 3767410 B2 | 4/2006 |
| JP | 3963433 B2 | 8/2007 |

OTHER PUBLICATIONS

International Search Report issued Apr. 8, 2014 in PCT/JP2013/084099.
U.S. Appl. No. 14/761,858, filed Jul. 17, 2015, Mochizuki.

* cited by examiner

BED HEIGHT ADJUSTMENT SYSTEM FOR VEHICLE

TECHNICAL FIELD

An aspect of the present invention relates to a bed height adjustment system for adjusting height of a bed of a vehicle.

BACKGROUND ART

Conventionally, as a vehicle-height adjustment device for adjusting a height of a vehicle, a device disclosed in Patent Literature 1 has been known. Patent Literature 1 describes a vehicle-height adjustment device that includes an air spring supporting a vehicle body, a leveling valve configured to adjust the vehicle height by supplying pressurized air to the air spring, and a cut valve configured to lower the vehicle height by releasing air when a passenger gets on or off the vehicle.

CITATION LIST

Patent Literature

[Patent Literature 1] Japanese Utility Model Application Laid-Open Publication No. 5-58410

SUMMARY OF INVENTION

Technical Problem

In a vehicle such as a dump truck including a bed, it is required to lower a height of the bed during loading the bed with a cargo. Improvement to meet this requirement remains.

In view of this, an aspect of the present invention aims to provide a bed height adjustment system for a vehicle that can improve convenience in loading/unloading of a cargo using a relay and can appropriately notify a driver that the height of the bed is in a dump mode.

Solution to Problem

As a result of intensive investigations, the inventor of the present invention has thought of a configuration that enables the height of the bed to be maintained in a dump mode (mode in which the height is lower than a height in a normal mode) using a relay even if the driver turns the engine key to OFF position. While the height of the bed is in the dump mode, the driver is notified of the dump mode by illumination of an indicator. However, in a case of using a relay to illuminate the indicator, a problem was newly found that once illumination of the indicator was turned off by turning the engine key to OFF position, the indicator could not be illuminated even if the engine key was turned to ON position again, so that the driver could not be appropriately notified that the height of the bed was in the dump mode.

To solve the above-described problem, according to an aspect of the present invention, a bed height adjustment system for adjusting height of a bed of a vehicle includes: an air spring supporting the bed; a valve unit connected to an air tank and configured to adjust height of the air spring by supplying and discharging air; a relay provided with a dump-signal line and a return-signal line each connected to the valve unit; a pressure switch configured to be switched between an ON state and an OFF state based on whether air is supplied from the valve unit; and an indicator that becomes illuminated state when powered when the pressure switch is in the ON state and becomes non-illuminated state when the pressure switch is in the OFF state. The valve unit adjusts the height of the air spring into a dump mode by inputting a signal of the dump-signal line, also adjusts the height of the air spring into a normal mode by inputting a signal of the return-signal line, and maintains the dump mode or the normal mode when the signal is not input.

With the bed height adjustment system according to an aspect of the present invention, because the height of the air spring is maintained in the dump mode or the normal mode when the signal is not input, loading/unloading of a cargo can be performed without returning automatically even when a driver pulls out the engine key. Thus, with this bed height adjustment system, because the driver can take a rest or do another operation after pulling out the engine key during loading/unloading of the cargo, convenience in loading/unloading of the cargo can be markedly improved. Furthermore, in this bed height adjustment system, when the pressure switch is switched into the ON state by supplying air thereto from the valve unit, the indicator becomes illuminated states when powered when the pressure switch is in the ON state. Accordingly, even if the engine key has been turned to OFF position, the indicator can be illuminated with electrical components being powered again while the height of the bed is in the dump mode. Thus, with this bed height adjustment system, it is possible to appropriately notify the driver that the height of the bed is in the dump mode using the relay.

In the bed height adjustment system according to an aspect of the present invention, the valve unit may include a magnetic valve connected to the air tank, and a discharge valve configured to adjust the height of the air spring into the dump mode by discharging air in the air spring during an open state of the magnetic valve. The magnetic valve may be connected to the dump-signal line and the return-signal line. The magnetic valve may switch into the open state by inputting the signal of the dump-signal line, switch into the closed state by inputting the signal of the return-signal line, and maintain the open state or the closed state when the signal is not input.

In the bed height adjustment system according to an aspect of the present invention, the discharge valve may be connected to the air tank and may be configured as a leveling valve for adjusting the height of the air spring by supplying and discharging air.

Advantageous Effects of Invention

The bed height adjustment system according to an aspect of the present invention can improve convenience in loading/unloading of a cargo using a relay, and can appropriately notify a driver that the height of a bed is in a dump mode.

DESCRIPTION OF EMBODIMENTS

Preferred embodiments of the present invention will be described hereinafter in detail with reference to the drawings.

Figure 1:
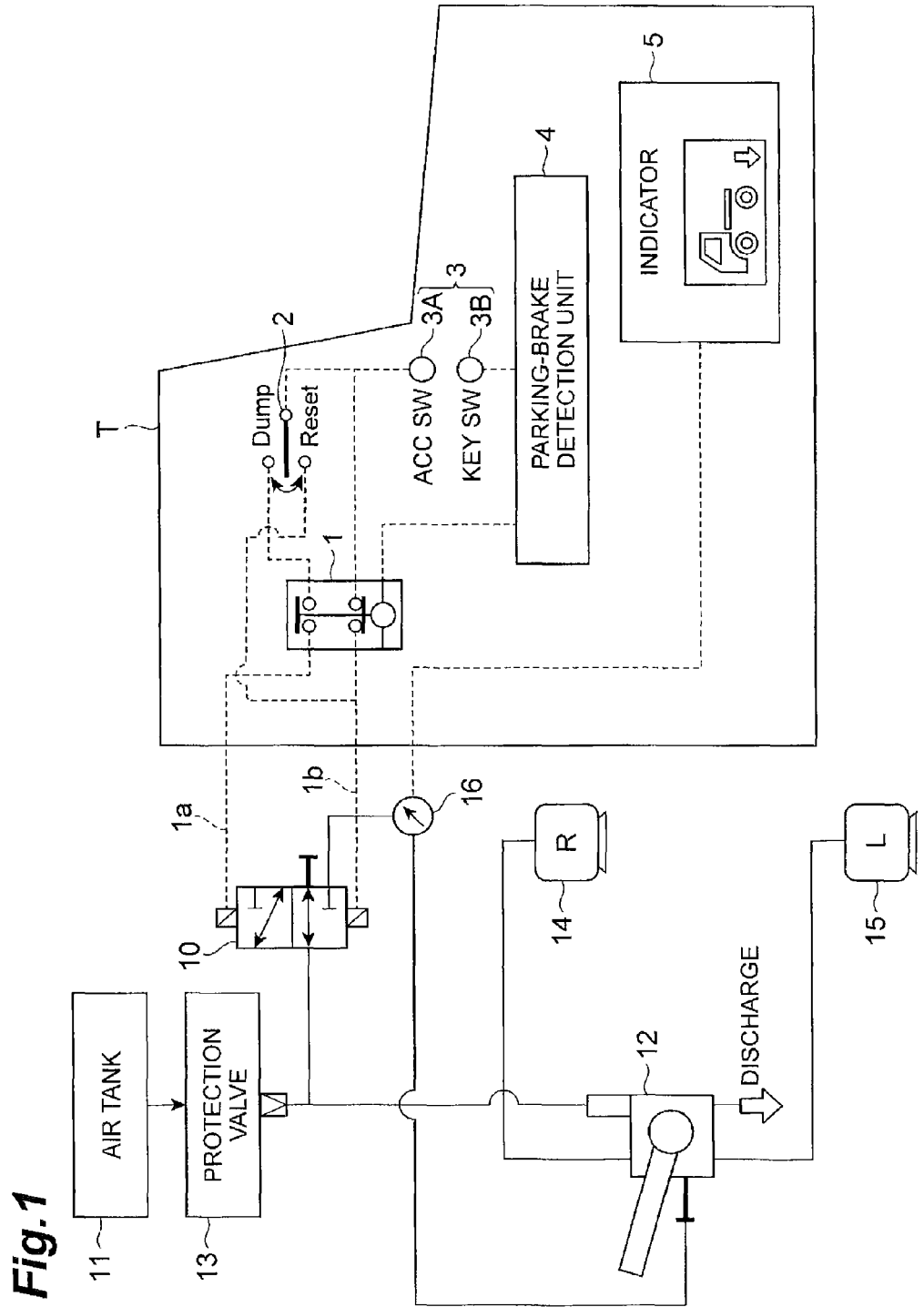
FIG. 1 is a schematic diagram illustrating one embodiment of a bed height adjustment system according to an aspect of the present invention.

As depicted in FIG. 1, a bed height adjustment system according to the present embodiment is a system included in a dump truck T to adjust the height of a bed of the dump truck T. This bed height adjustment system includes a relay 1, a magnetic valve 10, an air tank 11, a leveling valve 12, a protection valve 13, and air springs 14 and 15.

The relay 1 is a relay configured to control the output of power. The relay 1 does not have to be a single relay, and may be combined with a plurality of relays or other devices. The relay 1 is provided with a dump-signal line 1a and a return-signal line 1b each connected to the magnetic valve 10.

The relay 1 is connected to a dump switch 2, an engine key switch 3, a parking-brake detection unit 4, and an indicator 5.

The dump switch 2 is a momentary switch provided to a cab to switch modes of height of the bed. The dump switch 2 switches into a dump-switch ON state or a reset-switch ON state when a driver keeps pressing the dump switch 2 for a predetermined time (e.g., about 1 second).

The dump switch 2 corresponds to an accessory (ACC) switch 3A of the engine key switch 3. The dump switch 2 is switched into the dump-switch ON state or the reset-switch ON state when the ACC switch 3A is in the ON state, inputs a signal (supplying power) from an ACC power source to the relay 1, when the dump switch 2 is the dump-switch ON state. The dump switch 2 is connected to the dump-signal line 1a through the relay 1 when the dump switch 2 is in the dump-switch ON state, and is directly connected to the return-signal line 1b when the dump switch 2 is in the reset-switch ON state.

The parking-brake detection unit 4 detects the state of the parking brake of the dump truck T (whether the parking brake is working or released). The parking-brake detection unit 4 corresponds to a key switch 3B of the engine key switch 3, and operates with power supplied from an ignition-ON power source when the key switch 3B is in the ON state. The parking-brake detection unit 4 inputs a signal to the relay 1 when the parking brake is working. When the key switch 3B is in the ON state, the ACC switch 3A is also in the ON state.

The relay 1 changes connections by inputting signals of the parking-brake detection unit 4. The relay 1 cuts connection between the ACC switch 3A and the return-signal line 1b and also establishes connection between the dump switch 2 and the dump-signal line 1a while a signal is being input from the parking-brake detection unit 4. The relay 1 cuts connection between the dump switch 2 and the dump-signal line 1a and also establishes connection between the ACC switch 3A and the return-signal line 1b when the signal is not input from the parking-brake detection unit 4. Accordingly, when the parking brake is released with the ACC switch 3A being in the ON state, a signal is input to the return-signal line 1b through the relay 1. The configuration of the relay 1 with respect to the connections and the changing thereof is not limited to what described above, and various configurations can be used.

The indicator 5 is a display provided to an instrument panel in the cab to notify the driver that the bed is in the dump mode by illuminating. The indicator 5 is switched between illuminated state when powered and non-illuminated state on the basis of signals from the pressure switch 16. The illuminated state when powered means illuminating when the electrical components of the dump truck T are powered. For example, the indicator 5 illuminates when the ACC switch 3A of the engine key switch 3 is in the ON state, and stops illuminating when the power to the electrical components is stopped. The pressure switch 16 will be described later in detail.

The magnetic valve 10 is a valve that opens and closes by inputting signals of the dump-signal line 1a and the return-signal line 1b. The magnetic valve 10 is connected to the air tank 11 and the leveling valve 12 through tubes, and controls air supply to the leveling valve 12 by opening and closing. Between the magnetic valve 10 and the air-tank 11, a protection valve 13 is provided to shut off the path when air leakage occurs.

The magnetic valve 10 is connected with two wires of a dump-signal line 1a and a return-signal line 1b extending from the relay 1. The magnetic valve 10 switches into an open state by inputting the signal of the dump-signal line 1a, and switches into a closed state by inputting the signal of the return-signal line 1b.

This magnetic valve 10 is configured to memorize and maintain the current state. Specifically, the magnetic valve 10 maintains the open state during a period from inputting the signal of the dump-signal line 1a to inputting the signal of the return-signal line 1b. The magnetic valve 10 also maintains the closed state during a period from inputting the signal of the return-signal line 1b to inputting the signal of the dump-signal line 1a.

The magnetic valve 10 has a structure of maintaining the current state when the signal is not input from the dump-signal line 1a or the return-signal line 1b. This magnetic valve 10 does not require a standby current to maintain the open state or the closed state, and maintains the current state even if the engine key is turned to OFF position. As the magnetic valve 10, for example, a double-solenoid valve having a self-holding function can be used. The magnetic valve 10 is not limited to the double-solenoid valve, and various known structures having the above-described function can be used.

The leveling valve 12 is a valve configured to perform supply and discharge of air with respect to the air springs 14 and 15. The air springs 14 and 15 support the bed of the dump truck T. The leveling valve 12 is connected to the air tank 11 through the protection valve 13, and adjusts the height of the air springs 14 and 15 on the right and the left by supplying and discharging air fed from the air tank 11.

The leveling valve 12 adjusts the height of the air springs 14 and 15 to be in a normal mode. The normal mode is a mode in which the height of the air springs 14 and 15 are adjusted within a range in which the suspension function can be sufficiently secured, and is a basic mode considering travel of the dump truck T.

The leveling valve 12 is also connected to the magnetic valve 10 through the tube, and receives supply (pressure) of air from the magnetic valve 10 while the magnetic valve 10 is in the open state. The leveling valve 12 adjusts the air springs 14 and 15 to be in a dump mode by discharging air in the air springs 14 and 15 while receiving supply of air from the magnetic valve 10.

The dump mode is a stable mode in which air in the air springs 14 and 15 is sufficiently discharged, and is a mode in which the height of the air springs 14 and 15 is adjusted within a range suitable for loading/unloading the bed with a cargo. Herein, as the dump mode, air in the air springs 14 and 15 may be completely discharged so that the upper ends and the lower ends of the air springs mechanically abut each other. In this case, stability of the bed increases, which can effectively prevent the bed from wobbling during loading/unloading of a cargo, thereby improving convenience in loading/unloading of the cargo. As the structure of the leveling valve 12, various known structures may be used.

The leveling valve 12 and the magnetic valve 10 constitute the valve unit recited in the claims. The leveling valve 12 also corresponds to the discharge valve recited in the claims.

The pressure switch 16 is a switch that is switched into the ON state when air is supplied (pressure is applied) from the magnetic valve 10. The pressure switch 16 is switched into an OFF state when the supply (pressure)) of air from the magnetic valve 10 is stopped.

The pressure switch 16 is provided along a tube connecting the magnetic valve 10 to the leveling valve 12. Accordingly, the pressure switch 16 is switched into the ON state when the magnetic valve 10 supplies air to the leveling valve 12, and is switched into the OFF state when the magnetic valve 10 does not supply air to the leveling valve 12. In response to this ON-OFF switching of the pressure switch 16, the indicator 5 switches between illuminated state when powered and non-illuminated state.

The pressure switch 16 does not necessarily have to be provided along the tube connecting the magnetic valve 10 to the leveling valve 12. The pressure switch 16 may be connected only to the magnetic valve 10 through a tube. In this case, the magnetic valve 10 may be configured to supply air to the pressure switch 16 when supplying air to the leveling valve 12.

The following describes a control flow of the bed height adjustment system according to the present embodiment with reference to the drawings. Herein, a case when the key switch 3B of the engine key switch 3 of the dump truck T is in the ON state (when the engine is running) will be described.

Figure 2:
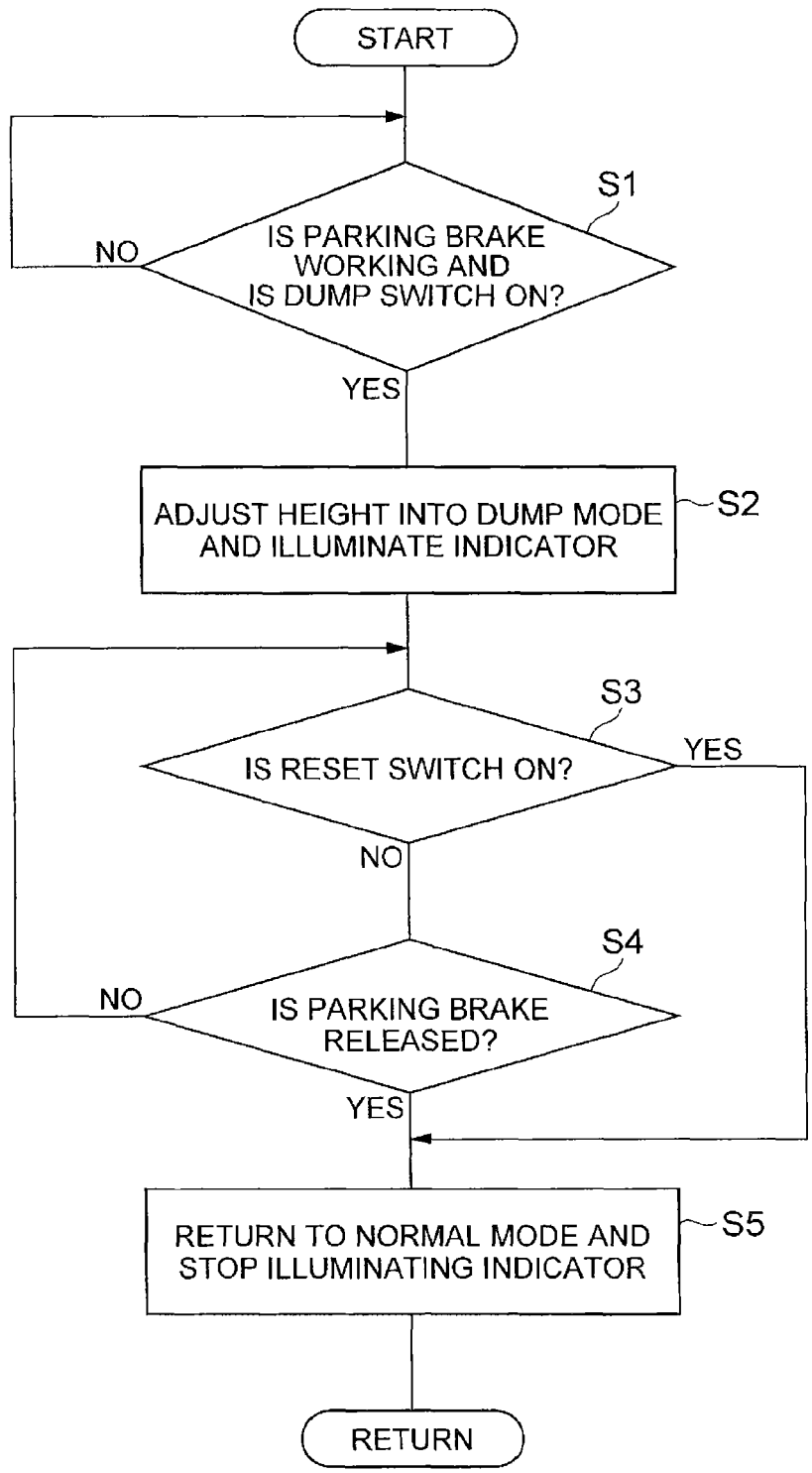
FIG. 2 is a flowchart illustrating a control flow of bed height adjustment in the bed height adjustment system.

As depicted in FIG. 2, the bed height adjustment system determines at step S1 whether both the dump switch 2 is in the dump-switch ON state and the parking brake is working.

In the bed height adjustment system, if the dump switch 2 is not in the dump-switch ON state or if the parking brake is released, no signal is input to the dump-signal line 1*a* through the relay 1 and step S1 is repeated.

In the bed height adjustment system, if the dump switch 2 is in the dump-switch ON state and the parking brake is working, a signal is input to the dump-signal line 1*a* through the relay 1. Specifically, while the parking brake is working, the signal is input from the parking-brake detection unit 4 to the relay 1, and accordingly the relay 1 establishes connection between the dump switch 2 and the dump-signal line 1*a*. Under this condition, by the dump switch 2 being in the dump-switch ON state, the signal is input from the ACC power source to the dump-signal line 1*a*.

At step S2, in the bed height adjustment system, the magnetic valve 10 switches into the open state by inputting the signal of the dump-signal line 1*a*, so that air is supplied to the leveling valve 12.

The leveling valve 12 discharges air in the air springs 14 and 15 to adjust the height of the air springs 14 and 15 into the dump mode when air is supplied from the magnetic valve 10. The height of the bed is thus lowered, thereby stabilizing the bed and improving convenience in loading/unloading of the cargo.

At this time, in the bed height adjustment system, even if the engine key of the vehicle is turned to OFF position, the open state of the magnetic valve 10 is maintained, and thus the dump mode is maintained without the bed returning automatically.

At this step S2, the indicator 5 is illuminated. Specifically, by the air supply from the magnetic valve 10, the pressure switch 16 arranged between the magnetic valve 10 and the leveling valve 12 is switched into the ON state. By the pressure switch 16 being switched into the ON state, the indicator 5 becomes illuminated state when powered, and accordingly the indicator 5 illuminates indicating that the height of the bed is in the dump mode.

Next, at step S3, the bed height adjustment system determines whether the dump switch 2 is in the reset-switch ON state. In the bed height adjustment system, if the dump switch 2 is switched into the reset-switch ON state, a signal is input to the return-signal line 1*b* and the process proceeds to step S5. If the dump switch 2 is not in the reset-switch ON state, the process proceeds to step S4.

At step S4, the bed height adjustment system determines whether the parking brake is working or released. If the bed height adjustment system determines that the parking brake is working, the process returns to the determination at step S3 again. If the bed height adjustment system determines that the parking brake is released, the relay 1 cuts connection between the dump switch 2 and the dump-signal line 1*a* and also establishes connection between the ACC switch 3A and the return-signal line 1*b*. Accordingly, a signal is input to the return-signal line 1*b*, and the process proceeds to step S5.

At step S5, in the bed height adjustment system, the magnetic valve 10 switches into the closed state by inputting the signal of the return-signal line 1*b*, so that the supply of air to the leveling valve 12 is stopped. When the air supply from the magnetic valve 10 is stopped, the leveling valve 12 supplies air to the air springs 14 and 15 to return the height of the air springs 14 and 15 into the normal mode.

At this step S5, the supply of air from the magnetic valve 10 to the pressure switch 16 is stopped, and the pressure switch 16 is switched into the OFF state. When the pressure switch 16 is switched into the OFF state, the indicator 5 stops illuminating. Subsequently, the process returns to step S1 again and the bed height adjustment system repeats the determination.

With the bed height adjustment system according to the present embodiment described above, because the height of the air springs 14 and 15 is maintained in the dump mode or the normal mode when the signal is not input, loading/unloading of a cargo can be performed without returning automatically even when the driver pulls out the engine key. Thus, with this bed height adjustment system, because the driver can take a rest or do another operation after pulling out the engine key during loading/unloading of the cargo, convenience in loading/unloading of the cargo can be markedly improved.

Furthermore, in this bed height adjustment system, with the pressure switch 16 being switched into the ON state when air is supplied from the magnetic valve 10, and indicator 5 becomes illuminated state when powered when the pressure switch 16 is in the ON state. Accordingly, even if the engine key has been turned to OFF position, the indicator 5 can be illuminated with electrical components being powered again while the height of the bed is in the dump mode. Thus, with this bed height adjustment system, it is possible to appropriately notify the driver that the height of the bed is in the dump mode using the relay 1.

In addition, this bed height adjustment system uses the magnetic valve 10 that can maintain the open state or the closed state when the signal is not input, and is switched between the dump mode and the normal mode by opening and closing the magnetic valve 10. This makes it possible to improve convenience in loading/unloading of the cargo with relatively simple configuration.

Furthermore, this bed height adjustment system adjusts the height of the air springs 14 and 15 into the dump mode with the leveling valve 12 discharging air. Accordingly, the number of parts can be reduced, whereby simpler system configuration and lower cost can be achieved than in a case of providing a discharge valve used exclusively for the dump mode.

This bed height adjustment system is also configured so that a signal is input to the dump-signal line 1*a* when the parking brake is working. This configuration enables the bed to be prevented from being lowered into the dump mode during traveling, for example, even if the dump switch 2 is pushed by mistake to be switched into the dump-switch ON state.

In the foregoing, the preferred embodiments of the present invention have been described, but the present invention is not limited to the above-described embodiments.

For example, the configuration of the valve unit recited in the claims is not limited to that described above. Specifically, a cut valve (discharge valve) used exclusively for the dump mode may be provided between the leveling valve and the air springs. In this case, the magnetic valve is connected to the cut valve, the height of the air springs is controlled into the dump mode by supplying air from the magnetic valve for the cut valve to discharge air in the air springs. Alternatively, the function of maintaining the dump mode or the normal mode when the signal is not input may be implemented by combining, for example, valves that are differently configured.

An aspect of the present invention is not limited to the case of equipping the dump truck with the system, and may be used for a passenger vehicle or a special vehicle that includes a bed. The height adjustment of the bed includes lowering the height of the entire vehicle to adjust the height of the bed into the dump mode.

INDUSTRIAL APPLICABILITY

According to an aspect of the present invention, it is possible to provide a bed height adjustment system for a vehicle that can improve convenience in loading/unloading of a cargo using a relay and can appropriately notify a driver that the height of the bed is in a dump mode.

REFERENCE SIGNS LIST

1 . . . relay, 1*a* . . . dump-signal line, 1*b* . . . return-signal line, 2 . . . dump switch, 3 . . . engine key switch, 3A . . . ACC switch, 3B . . . key switch, 4 . . . parking-brake detection unit, 5 . . . indicator, 10 . . . magnetic valve (valve unit), 11 . . . air tank, 12 . . . leveling valve (valve unit, discharge valve), 13 . . . protection valve, 14, 15 . . . air spring, T . . . dump truck

The invention claimed is:

1. A bed height adjustment system for adjusting height of a bed of a vehicle comprising:
an air spring supporting the bed;
a valve unit connected to an air tank and configured to adjust the height of the bed by adjusting a height of the air spring by supplying and discharging air;
an electric relay provided with a dump-signal line and a return-signal line each connected to the valve unit;
a pressure switch configured to be switched between an ON state and an OFF state based on whether air is supplied from the valve unit; and
an indicator that becomes illuminated state when powered when the pressure switch is in the ON state and becomes non-illuminated state when the pressure switch is in the OFF state,
wherein the valve unit adjusts the height of the air spring into a dump mode by inputting a signal of the dump-signal line, returns the height of the air spring into a normal mode by inputting a signal of the return-signal line, and maintains the dump mode or the normal mode when no signal is input.

2. The bed height adjustment system according to claim 1, wherein the valve unit comprises:
a magnetic valve connected to the air tank; and
a discharge valve configured to adjust the height of the air spring into the dump mode by discharging air in the air spring during an open state of the magnetic valve,
wherein the magnetic valve is connected to the dump-signal line and the return-signal line, and
wherein the magnetic valve switches into the open state by inputting the signal of the dump-signal line, switches into a closed state by inputting the signal of the return-signal line, and maintains the open state or the closed state when no signal is input.

3. The bed height adjustment system according to claim 2, wherein the discharge valve is connected to the air tank and configured as a leveling valve for adjusting the height of the air spring by supplying and discharging air.

4. The bed height adjustment system according to claim 1, further comprising:
a dump switch to switch the height of the bed between the dump mode and the normal mode, the dump switch being selectively connected to the dump-signal line and the return-signal line.

5. The bed height adjustment system according to claim 2, further comprising:
a dump switch to switch the height of the bed between the dump mode and the normal mode, the dump switch being selectively connected to the dump-signal line and to the return-signal line; and
a parking brake detection unit that detects whether a parking brake of the vehicle is working or released,
wherein the magnetic valve switches into the open state when the dump switch is operably connected to the dump-signal line and the parking brake detection unit detects that the parking brake is working.

* * * * *